(No Model.)

E. CHABOT.
JOINTED RULE.

No. 597,261.  Patented Jan. 11, 1898.

Witnesses
P. A. Ballou
J. E. Arnold

Inventor.
Ephraim Chabot.

By
Arnold and Barlow
Attorneys.

UNITED STATES PATENT OFFICE.

EPHRAIM CHABOT, OF PROVIDENCE, RHODE ISLAND.

JOINTED RULE.

SPECIFICATION forming part of Letters Patent No. 597,261, dated January 11, 1898.

Application filed August 11, 1897. Serial No. 647,825. (No model.)

*To all whom it may concern:*

Be it known that I, EPHRAIM CHABOT, of Providence, in the county of Providence and State of Rhode Island, have invented certain new and useful Improvements in Jointed Rules; and I do hereby declare that the following is a full, clear, and exact description thereof, reference being had to the accompanying drawings, and to the letters of reference marked thereon, which form a part of this specification.

This invention relates to the class of jointed measuring-rules used by carpenters and other mechanics.

It is fully explained and illustrated in this specification and the accompanying drawings.

Figure 1:
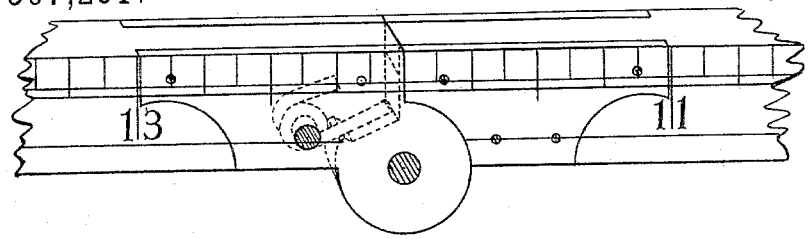
Figure 2:
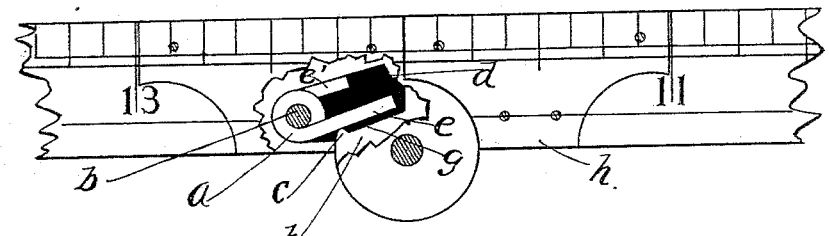
Figure 3:
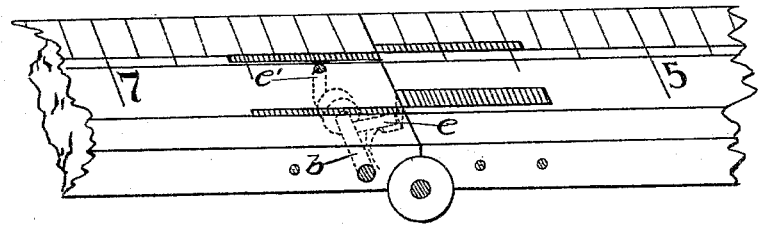
Figure 4:
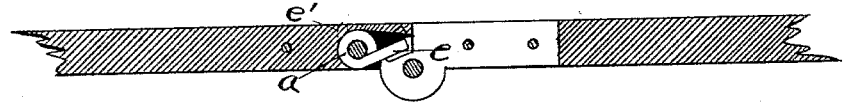
Figure 5:
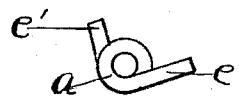

Figure 1 represents the middle joint of a two or four part rule and a part of the rule on each side of the joint in perspective. Fig. 2 shows an elevation of the same joint and parts of a rule with part of one of the joint-plates broken away to show the inside. Fig. 3 represents in perspective the joint of a four-part rule nearer to the end of the rule. Fig. 4 shows in elevation the joint and parts of the rule shown in Fig. 3 with a part of the outer joint-plate broken away, as in Fig. 2. Fig. 5 is a view of the spring separate.

The object of this invention is to facilitate the use of the rule by providing means for holding the parts open straight with the rule in any position, as rules of this class after a little use become loose in their joints and are liable to shut up when held in certain positions and defeat the attempt to measure as desired. To accomplish this object, I put a spiral spring $a$ around the rivet $b$ nearest to the joint, having first recessed out a place $d$ in the wood around the rivet to receive the spring. Then a notch $g$ is made in the periphery of the round part of the inner plate $h$ that comes from the opposite side of the joint, so as to leave a corner $c$ of the plate for one leg $e$ of the spiral spring to rest on, while the other leg $e'$ of the spring bears against the top of the recess. This spring $a$ is made with a tendency to unwind or spread the legs $e$ $e'$ apart, (see Fig. 5,) which causes the leg $e$ to press on the corner $c$ and prevent the parts of the rule from closing together. The springs applied to the middle and side joints are practically the same, operating in the same way to hold the rule straight when it has been opened. When the rule is closed, the leg $e$ of the spring $a$ will rest on the round part of the plate $h$ and have no tendency to open or close the rule.

Having thus described my improvements, I claim as my invention and desire to secure by Letters Patent—

In a jointed rule, the combination of a spiral spring held in a recess in the rule, a pin passing through the sides of the recess and the spring, one leg of said spring bearing on the top of said recess and the other leg bearing on a corner of the inner joint-plate of the other part of the rule when open, substantially as described.

In testimony whereof I have hereunto set my hand this 7th day of August, A. D. 1897.

EPHRAIM CHABOT.

In presence of—
HOWARD E. BARLOW,
P. A. BALLOU.